United States Patent Office 3,281,932
Patented Nov. 1, 1966

3,281,932
WELDING COMPOSITION AND METHOD
Lionel Cinamon, Point Drive S., Lake Peekskill,
Putnam Valley, N.Y.
No Drawing. Filed Nov. 19, 1963, Ser. No. 324,878
11 Claims. (Cl. 29—495)

This invention relates to the welding of metals, such as an iron group metal or alloys of any of them, in which any of them predominate. The invention relates also to the welding of other metals whose oxides, like those of the iron group metals, have lower free energy values than that of aluminum oxide. Much too often the foregoing metals, whose oxides have free energy values lower than that of aluminum oxide, when welded by methods heretofore employed, manifest some weakness at the weld site, for example, by way of an undesirably porous, often brittle or otherwise weak weld.

It occurs in relation to the development of the invention that such undesirable results emanate from an undesirable quantitative and physical content of such metal compounds as oxides, nitrides and carbides of such various welded metals at the site and about the area of the weld.

The invention is that of what can be called a deoxidizing weld-enhancer suspension composition which provokes production of a distinctly improved weld over that which oridnarily otherwise would be obtained in the welding of an iron group metal or other metal whose oxide has a lower free energy value than that of aluminum oxide, or alloys wherein such metal predominates. The method of the invention is that of an improved method of welding which, by its use of the suspension composition, yields distinctly improved and advantageously substantially non-porous, non-brittle, hard and high tensile strength welds with such metals.

The new composition and method of the invention are applicable particularly to obtaining such improved welds in welding ferrous metals such as the various steels, for example, cold rolled steel, improperly deoxidized steels, stainless steels, and other ferrous metal alloys wherein iron predominates as well as to the other iron group metals cobalt and nickel and also to nickel alloys including Monel metal. While it then may be more convenient to detail the description of the invention with particular reference to its application to ferrous metals and alloys, it is to be understood that such description of the weld-enhancer suspension compositions and method using any of them applies likewise to these others of the iron group metals as well as to the other metals whose oxides have free energy values below that for aluminum oxide.

The method of the invention includes (i) before welding, applying over the welding site or zone of the metal to be welded a film-coating of the liquid weld-enhancer suspension composition hereof (which composition contains a suspension of a mixture of finely divided, herein referred to weld-improving agents dispersed in a solution-dispersion of a non-carbonizing organic resinous binder for them in a volatile solvent for the binder), (ii) allowing the solvent for the binder to evaporate off so as to leave a firmly adhering film of from at least tacky to dry-to-the-touch resinous binder with said mixed weld-improving agents held fixedly dispersed in it at the welding site, and (iii) then welding the so-coated metal pieces in customary manner.

The heat of the welding step then causes the burning off of the set and dry non-carbonizing resinous binder of said composition of the invention. This term "non-carbonizing" used to describe the resinous binder means that the organic binder is one which leaves no, or no significantly noticeable, carbon residue over the weld site when the organic resinous binder, after being contacted by the flame of the welding torch, thus is burnt off from the surface on which it had been deposited, under the temperature and burning conditions provided by the welding flame or arc.

The compositions and method of the invention can be used in any of the customary forms of welding, such as inert arc welding as in the heliarc process using a tungsten electrode, or autogenous welding, with or without filler metal, or even in vacuum welding. These compositions and method can be used in making all forms of welds, e.g. butt (either overlapping or side by side) or lap joints.

In the casting of ingots of them, many metals on cooling entrap considerable amounts of gases which to a marked extent are retained and occluded in the metal on rolling and forming. Often the hot molten and solidifying metal forms occluded oxides and nitrides, as from occluded air, and carbides from carbon used in recovering the metal from its ore. The unreacted occluded gases present a further serious problem when the metals are to be fusion welded.

That is so because when the welding arc or flame applied at the welding line or seam melts the metal, such trapped gases are enabled to be freed so that they escape through the molten pool of metal there with resultant agitation (sometimes called "boiling") of the molten metal at the weld site. The resulting boiling so produced under the welding flame persists while the welding pool metal is cooling and until the metal solidifies. That not only results in a porous weld but at the same time provokes a highly disadvantageous instability of the welding flame or arc. For these and other reasons when such metals are welded, the resulting welds are brittle and porous and contain an undesirable extent of pin-holes, leaving a weld joint of undesirably reduced tensile strength.

In an earlier stage of the investigation prior to the invention, addition of aluminum during the welding was attempted, for example, in the form of drawn wire. That was unsatisfactory because it added too much aluminum to the weld pool and produced a burnt and irregular surface. Controlling the aluminum flow was too critical in production use, and the wire burning off rate was too erratic. Later adding aluminum as powder or flake in an ordinary paint as a binder was tried. However, in each case such ordinary paint binder decomposed and so carbonized too readily even at the earlier lowest temperatures developed near the welding operation. Thus, the aluminum melted and was oxidized too soon or was blown away ahead of the welding pool, yielding welds of highly questionable and unsatisfactory quality.

All of the various foregoing disadvantages and other shortcomings are avoided by using the deoxidizer weld-enhancer suspension compositions and method of this invention. Their use (a) eliminates escape of gases occluded in the metal, (b) gives a more fluid weld pool, (c) greatly reduces sparking that ordinarily otherwise occurs, and (d) results in highly desirable reduction of pin-holes and porosity to substantially no porosity, with resulting good grain fineness and density in the weld indicative of an adequately hard, smooth and stronger weld.

The method of the invention, using its deoxidizer weld-enhancer suspension compositions, applies especially, but is not restricted, to the types of welds generally made without using filler wire and which usually involve fusing together two sections of metals, including, for example, butt seam, butt corner, edge and lap welds, and with the welding torch arc or flame either manually or automatically operated.

Considered broadly, the deoxidizer weld-enhancer compositions of the invention comprise a flow-coatable suspension of a mixture finely divided weld-improving agents with:

(A) by far its greater part being so-called oxygen-getter elements, (i) the major portion of which elements is at least one of the light weight metals having only one valence, preferably aluminum and magnesium, and including also zinc, as well as suitable mixtures of any of them, and (ii) a minor portion of the metalloid silicon; and (B) a minor part of said agents especially and advantageously being at least one welding-enhancer material, such as (a) any of the multi-valence heavy metals molybdenum, titanium, and zirconium, each of the latter two having a greater oxidation potential than iron, any of which can be replaced in part or as a whole by (b) any of the alkaline earth carbonates as barium carbonate, calcium carbonate and strontium carbonate; said mixture being suspendable in a flow-coatable non-carbonizing, adherent film-forming, fluid organic suspending-binding vehicle, containing an organic binder portion dispersed in a volatilizable liquid solvent therefor. All of said mixed finely divided weld-enhancing agents are flow-coatably suspended in the liquid vehicle especially upon being agitated.

A "flow-coatable" suspension of the finely divided weld-enhancing agents in the non-carbonizing film-forming liquid suspending-binding vehicle means a suspension that can be applied to the surface of the metal to be welded to affix to it a film by flow-coating, that is to say, by spraying, brushing, or dipping, or other suitably equivalent method of applying, the suspension (agitated uniformly to suspend its finely divided materials content in its liquid vehicle).

By "multi-valence" heavy metal is meant such metal which has more than one valence, e.g. as 4, 3, and 2 for titanium zirconium, or 6, 4, 3 and 2 for molybdenum, as distinguished from merely being polyvalent.

The organic fluid vehicle for the mixture of finely divided weld-improving agents such as the oxygen-getter metal and silicon elements and the welding-enhancer materials, consists primarily of a solution-dispersion of an adherent film-forming advantageously also thermo-setting, non-carbonizing, organic resinous binder dissolved or stably dispersed, generally as the minor portion, in an organic liquid solvent (or dispersing agent) for the resinous binder. Such solvent-dispersing agent for the binder, as the major portion of said vehicle, should be readily volatile at ambient atmospheric temperature or at least at any elevated temperature well below the flash point of said agent and the burning temperature of the binder, so as on evaporating to leave behind a from at least only slightly tacky to dry-to-the-touch, firmly adherent, substantially continuous film of the organic resin binder having the mixed finely divided weld-improving agents substantially uniformly dispersed in it.

The expression "oxygen-getter" is used in identifying some of these finely divided agents because they primarily readily combine with oxygen in the welding zone and even combined with metal melted into the weld pool, in that they a have a greater affinity for it than do the metals being welded. However, their entire activity in the welding process apparently need not be confined wholly to reaction with oxygen. In other words, without intent of being bound by any specific principle or mechanism of the welding reaction, it is possible that the oxygen-getters contribute their benefit along with the other essential weld-improving agents also by combining with nitrogen either occluded in the metal or while present about the weld pool, or react in some way with metal nitrides so present and possibly also with metal carbides likewise there.

The aforesaid applied adherent non-carbonizing film serves to maintain the mixed weld-improving agents including the oxygen-getter metals and silicon, about the welding site or area during the development of the elevated temperatures about it, sufficiently along for these mixed finely divided materials to contribute their aforesaid indicated effect, including combining with occluded gases especially oxygen in and about the weld pool and with oxygen combined with any of the metal there being welded or in the pool.

The expression "solution-dispersion," as used about the fluid vehicle wherein the finely divided solid particles are dispersed, is generic to true as well as colloidal solution of the binder in the solvent medium, regardless of whether the binder actually is dissolved, or merely is colloidally dispersed, in the volatilizable liquid solvent or dispersing medium or vehicle for it.

Viewed broadly, the method of the invention comprises (i) applying over the weld site or along the welding route at least one film-coating of a fluid flow-coatable deoxidizer or reaction flux primer dispersion composition of the invention, with its mixed finely divided weld-improving agents substantially uniformly suspended in it, (ii) allowing the solvent-dispersing agent for the binder to evaporate from the film-coating to leave behind on the metal surface a from at least only slightly tacky to dry-to-the-touch, substantially completely continuous, adherent film with the mixed weld-improving agents substantially uniformly distributed in the remaining film; (iii) then applying the welding flame or arc about the welding site including the metal surface covered by said film to burn off the organic content of said film and melt the contiguous metal to produce a welding pool about said coated area; and (iv) allowing the weld pool at the welding site to solidify.

Finely divided aluminum is at least usually the most practical metal to use as the major portion of the oxygen-getter part of the suspension of finely divided weld-improving agents of the compositions of the invention. As noted above, aluminum may be replaced as a whole, but presently preferably only in part, by the equivalent amount of some other finely divided light weight metal similar to aluminum, such as magnesium or zinc, or mixtures of any of them. Then, the light weight oxygen-getter portion, whether its metal component is aluminum, magnesium, or zinc, or any mixture of any of them, along with its silicon component should be present by weight to the extent of at least five percent and may range up to about fifteen percent of the entire fluid primer suspension, and preferably should be from about eight to about ten percent including the silicon and such amount of it as may be introduced with zirconium as ferro-zirconium. The light weight metal component can vary from about 85 to 95 percent of the total light weight oxygen-getter.

Molybdenum, titanium and zirconium can be used singly or jointly with any of the others of them or of the alkaline earth metal carbonates, either as the sole or major part of the multi-valence heavy metal welding-enhancer material along with the oxygen-getter mixture. Each of titanium and zirconium has a greater oxidation potential than iron because its oxide forms more readily, i.e. has a greater free energy, than does the iron oxide at the welding temperature, or other metal or alloy sought to be welded.

A presently more commonly available form of finely devided zirconium is as a ferro-zirconium alloy which contains about 12.6 percent of zirconium by weight and may vary betwen about 12 to 15% of its (along with about 42.2% or iron, 41.2% of silicon, and about 0.2% of carbon).

Similarly, either of the other weld-enhancer materials, namely, the alkaline earth metal carbonate weld-improver materials as barium carbonate or any other such carbonate can be user alone or jointly with any other one or more of them or of the molybdenum, titanium and zirconium, to the extent of a total of from about 0.2 to about five percent by weight of the total weight of the suspension.

Any of the weld-improving agents, i.e. the light weight oxygen-getter elements (metals as well as silicon) and welding-enhancer materials (multi-valent metal and aldominately non-carbonizing and advantageously thermo-setting.

The applicable binders include thermo-setting, non-carbonizing synthetic organic film-forming, methylol-amino type resins such as urea-formaldehyde resins, melamine resins, particularly the melamine-formaldehyde resins (condensation products of melamine with formaldehyde to give from dimethylol to hexamethylol melamine) and especially the lower-alkylated melamine-formaldehyde resins (such poly-methylol melamines reacted with lower alkanols to give such alkylated products), and most effectively the butylated (either butyl or isobutyl linked to ring carbon) melamine-formaldehyde resins, for example, Cymel 245–8 (of American Cyanamid Company). The latter shows color Gardner (1933) maximum 1, viscosity of L to O (Gardner-Holdt 25° C.), hydrocarbon tolerance of minimum 200, and 8.3 pounds per gallon approximately, when dissolved in equal parts of a solvent containing 2 parts of xylol to 3 parts of butanol.

Some individual member of the foregoing methylol-amino-type resins may be suitable alone or admixed with some one or more of them, such as a butylated melamine-formaldehyde resin, dissolved in a suitable hydrocarbon common solvent constituent.

However, in many cases it is advantageous to admix such melamine-formaldehyde type resin with an even better adhering and non-carbonizing, (i) non-drying (i.e. non-oxidizing) alkyd resin such as the saturated fatty acids modified alkyd resin Rezyl 92–5 (of American Cyanamid Company), or (ii) a short-oil or medium-oil drying (i.e. oxidizing) alkyd resin formulated either with soya-type oil fatty acids or others of a similar type and degree of unsaturation, for example, the dehydrated castor oil modified alkyd resin Rezyl 330–5 (of American Cyanamid Company). Often it is advantageous to admix the methylol-amino type resin such as the lower-alkylated melamine-formaldehyde resin with both of these (i) and (ii) types of alkyd resins to obtain a film-forming, non-carbonizing and thermo-setting, adhesive film-coating organic resinous binder solution-dispersion which provides a highly practical advantage in the suspension compositions and method of the invention.

Rezyl 92–5 resin contains 6 parts of its non-drying alkyd resin dissolved in 4 parts of xylol. Rezyl 330–5 resin has equal parts of its dehydrated castor oil modified alkyd dissolved in xylol. Parts are by weight.

Thus, any such suitable organic highly adhesive and non-carbonizing resinous binder substance can be used alone, or along with one or more of the same or different types of organic resinous binder substances, so long as they are compatible with one another when dissolved or colloidally dispersed in the applicable solvent vehicle and applied to the metal surface.

The total content of organic resinous binder constituent in the liquid suspension-dispersion vehicle or medium should be, within the already mentioned range, sufficient to hold the mixed finely divided solids after application of the composition to a metal surface and evaporation of the solvent, in a satisfactorily, sufficiently set, dust-free, non-flaking, non-peeling, from at least only slightly tacky to dry to the touch, adherent, single film-coating on the metal surface. Ordinarily, from about 23 to about 28 or so percent by weight of the total composition is generally advantageous, especially when aluminum is the lighter of the suspended metals.

A "readily volatile solvent" means one that ordinarily volatilizes under ambient conditions without any heating or with not too great application of heat to raise its temperature and bring it toward its boiling point to enable it to evaporate from a film-coating of the fluxing primer suspension over metal to be welded. In other words, that means one which evaporates from such coating at atmospheric or slightly elevated temperature in a reasonably short time, say within about 15 minutes or less, by ordinary air drying or mild forced (stream or elevated temperature) drying.

To expedite the drying, when needed, the welding flame may be used by directing it toward the film-coating to heat the atmosphere about it to provide mild forced drying. Then suitable precaution is needed to avoid its touching the film-coating so as not to ignite the solvent vehicle or evaporate it too fast, which might cause the film to blister and break. It is desirable that breaks over one-eight of an inch, and particularly over, say, a quarter of an inch in length in the film be avoided so as not to disrupt the substantial continuous character of the dried film left on the metal surface.

Obviously, any mixed solvents should have sufficient mutual solubility to form a homogeneous solvent. The specific solvents and proportions of each of them to use in any such mixture depends on (a) the specific organic resinous binder substance or resin mixture used, and (b) the desired duration or shortness of the drying time.

When the alkylated methylol melamine resins and alkyd resins are used, the solvent can be primarily hydrocarbon and advantageously predominately aromatic hydrocarbon so long as the organic resinous binder constituent dissolves in it directly or on inclusion of a small proportion of a mutual hydrocarbon solvent. In many cases, it may be helpful to include also a significant proportion, say, at least about 15% of the total weight of solvent, of a more highly volatile aliphatic hydrocarbon solvent, such as cyclohexane, hexane, cyclopentane or pentane, or even mineral spirits or high flash naphtha.

The respective amounts of each solvent and particular combination of solvents depends on the solubility or colloidal dispersability of the specific resin or resins in the specific solvents and the relative volatility of the latter in relation to the time within which the film remaining, after solvent evaporation, has to be left from only slightly tacky to dry-to-the-touch.

More often and perhaps generally, the solvent (whether single or a mixture) constituent of the suspension compositions can be its major or predominate constituent, at least usually exceeding the total weight percentage of the finely divided solids mix.

Suitable variations can be made in the selection and amount of any of the three essential constituents of the invention, as well as in their respective proportions to one another within the hereinabove recited ranges of proportions. That also depends on the thickness of the film considered necessary to apply to the surface of the metal at the weld site for the character of the particular metal to be welded, and the extent of adhesion. The attainment of the desired features by any specific suspension composition to be prepared can be noted readily by the simple test of making a flow-coatable application of a film-coating of often merely the liquid dispersing binder vehicle or medium to see how fast the solvents evaporate from it, for example, by directing the heat from the welding torch flame, to leave the dry-to-the-touch film. Then the flame of the welding torch can be applied against that film, for example, to see whether it is suitably adhesive and non-carbonizing.

The deoxidizing flux primer suspension compositions of the invention are illustrated by, but not restricted to, the following examples:

*Example 1*

Fifty-three gallons of toluol and 76 gallons of hexane were admixed uniformly with 218 gallons of xylol to provide 347 gallons of mixed solvents. 65 gallons of Cymel 245–8 butylated melamine-formaldehyde resin (solution as above described) were uniformly diluted with 135 gallons of these mixed solvents to give 200 gallons of a diluted Cymel 245–8. 26 gallons of Rezyl 330–5 resin (solution as above described) were uniformly diluted with 54 gallons of the mixed solvents to give 80 gallons of diluted Rezyl 330–5. Then 33 gallons of the Rezyl kaline earth metal carbonate) should be used in such finely divided form as to enable satisfactory dispersion of them in the fluid deoxidizer or reaction flux suspension to be applied at the welding site. It is desirable that generally these solid materials be finely divided sufficiently for all particles to pass through a 100 mesh screen and better still all particles through 200 mesh or smaller, with the average particles being strikingly more effective when small enough to pass through the 325 mesh screen. Any which can be obtained for all to pass through the 400 mesh screen are advantageously still better.

Finely divided aluminum, for example, currently is readily available in what commonly is referred to in the paint trade as aluminum paste. An example of such paste contains 65.5 to a maximum of 66% of aluminum particles (100% of which pass through a 325 mesh screen) enveloped in a relatively highly volatile hydrocarbon solvent, such as mineral spirits and/or high flash naphtha. The specific gravity of this paste is about 1.52, and 0.0790 gallon of it weighs a pound.

The total content of all finely divided solid weld-improving agents in the fluxing primer suspension of the invention generally should be less than that which no longer lets the suspension be applied by flow-coating as a suitable single film-coating. Alternatively, such total metals, silicon and alkaline earth metal carbonate content should be less than that which would cause a filmcoating of its as applied to the metal surface to have such poor adhesion that it would crumble, flake or peel after the solvent constituent is evaporated off.

In other words, the total mixed welding-improving agents content should not be so high as to give the composition such high viscosity which prevents the possibility of spraying it at commonly used paint spraying pressures, namely, at least about 15 pounds per square inch. These finely divided solids content then should enable spraying the suspension at pressures at least between about 15 and 60 p.s.i.

While as little as five percent of total of all weldingimproving agents solids content in the complete suspension can give suitable results in some cases, a good applicable range is to have from that up to about twenty percent total of them, including from about 0.6 to about 1.2% of total silicon. Generally, as thus far noted, it is most effective to have a total of at least about 10% to about 15% for the entire mixture of these agents in the suspension, or possibly up to about 18%. All percentages are by weight unless otherwise stated.

For substantially generally satisfactory results, the solvent constituent content should exceed the total solids content (i.e. welding-improving agents solids content plus organic film-forming resinous binder content). Thus, the solvent content, as the major portion by weight of the composition, advantageously can be at least about 55% of it, and better still about 60%. The total resinous binder content can vary from about 20 to about 30% of the total composition content.

The specific proportions and limits of the various respective constituents in each case is influenced by the viscosity developed under total finely divided solid agents dispersed in the liquid suspending vehicle and the proportion of dissolved and/or dispersed organic resinous binder content to organic solvent used for it in the vehicle.

As to the liquid suspension medium or vehicle, it appears that the lower its viscosity, the lower is the overall viscosity of the complete suspension and the nearer the total content of the finely divided solid materials can approach the above mentioned maximum. In any event, the proportions of the various solid and liquid constituents of the suspension should be such to enable it to be fluid enough for it to be applicable to metal to be welded by flow-coating, for example, to be sprayed under at least about 15 pounds per square inch pressure.

The respective particle sizes of the various weld-improving agents, whether metals or non-metals, should be smaller than that size which would prevent good adherence of a film-coating of the deoxidizer primer suspension applied to the metal surface and so cause such film to flake, crumble or peel at the particular total content of those finely divided materials.

A single film-coating of the deoxidizer fluxing primer suspension of the invention means an application by flowcoating of the suspension (agitated to suspend its finely divided particles content uniformly in the liquid vehicle) once over the metal surface to deposit a uniform and substantially continuous film of the suspension over it. Ordinarily, a single film-coating, after being dried by loss of solvent, is about one ten-thousandths to three-thousandths, and more generally about two ten-thousandths, of an inch thick.

The deoxidizer fluxing primer suspension thus applied by flow-coating to the metal surface, after evaporation of the solvent content of the liquid vehicle, dries to a nonpeeling, non-flaky, from at least only slightly tacky to dry-to-the-touch and adherent, substantially continuous film having the finely divided solids particles relatively uniformly distributed and firmly held in such film on the welding site or area.

By the above indicated proportions of the three different types of essential constituents (i.e. admixed solid particles, resinous binder, and solvent) for the suspension composition of the invention, it is an advantage in the method of the invention that the flow-coating applied film of the suspension can become from thus tacky to dry-to-thetouch readily within about 15 minutes, and often sooner, as within as little as 5 minutes and at times even within a minute or two, when thus applied in a single film-coating; as influenced by the constitution of the solvent vehicle. Such dry-to-the-touch film then is tough and flexible, especially after thermo-setting following evaporation of the solvent constituent and applying sufficient heat to thermoset the resinous binder.

The organic resinous binder constituent of the deoxidizer flux primer suspension can be a single thermo-setting filmforming resin which can be flow-coatably applied to give an adequately adherent film which is sufficiently heat resistant, for example, to be non-combustible when subjected on the surface of the metal to be welded to a temperature approaching about 500° F. with no appreciable change in adhesion up to and possibly beyond 700° F. and to maintain adherent substantial continuity with no significant evidence of burning possibly even up to about 1000° F.; and which is non-carbonizing.

The resinous binder should dissolve stably in and be compatible with the readily volatile organic solvent constituent for dissolving or colloidally dispersing the binder. Thus, the resinous binder should be soluble or colloidally dispersible in such ordinary resin solvents as aromatic hydrocarbon solvents such as xylol (xylene) or toluol (toluene) alone or admixed, as well as with others such as the more volatile aliphatic hydrocarbon solvents as hexane, cyclohexane, cyclopentane and pentane, and also mixtures of such solvents, e.g. as mineral spirits, high flash naphtha, or even halogenated as chlorinated aliphatic hydrocarbons such as trichloroethylene.

Such non-carbonizing, organic film-forming resinous binder dissolved to the extent of one part in about two to three parts of such aromatic or aliphatic organic solvent or mixtures of them (otherwise inert to the binder), after application to the surface of the metal, e.g. an iron group metal, to be welded and evaporation of the solvent constituent generally within about 15 minutes or less, remains on the metal as an adherent, set, substantially continuous, from only slightly tacky to dry-to-the-touch film.

Such starting organic resinous binder constituent may be a from semi-solid or solid resinous substance or mixture of such substances. It need not have any definite melting point or tendency to crystallize, so long as it is pre- 92-5 resin (solution as above described) were uniformly diluted with 67 gallons of the mixed solvents to give 100 gallons of diluted Rezyl 92-5.

The thus prepared respective separate volumes of diluted solutions of that Cymel and the two Rezyl resins were mixed together in a mixing tank equipped with a suitable agitator to provide 380 gallons of mixed diluted resins solution.

Into the latter there were stirred 550 pounds of an aluminum paste containing 65.5% of aluminum particles (all of which pass through a 325 mesh screen) admixed in mineral spirits to a volume of just about 43.5 gallons, which were diluted with 61 gallons of the mixed solvents used in portions to rinse the entire aluminum content into the mixed diluted Cymel and Rezyl resin solutions.

While continuing the agitation, 31 pounds of finely divided silicon (200 mesh) were added, and the container from which it was added was rinsed with 15 gallons in portions of the mixed solvents to wash all of it into the mixing tank. That then provided 500 gallons of what may be referred to as the basic mix containing the oxygen-getter elements aluminum and silicon admixed in the binder resins (i.e. the Cymel and Rezyl resins) dissolved in mixed essentially aliphatic and aromatic hydrocarbon solvents (including about 5.3% of butanol).

To this thus prepared basic mixture was added 60 pounds of finely divided titanium (325 mesh) and the container from which it was added was rinsed in portions with a total of 15 gallons of the mixed solvents. That provided a total of 520 gallons of the final product reaction flux primer mixture of this example containing the basic mixture and the additional oxygen-getter titanium.

*Example 2*

Example 1 was repeated in all of its details except that its 60 pounds of finely divided titanium were omitted and replaced by 60 pounds of finely divided ferro-zirconium (325 mesh and of the composition set forth hereinabove).

*Example 3*

Example 1 was repeated in all of its details except for using only 10 gallons of mixed solvents instead of 15 gallons for rinsing the silicon and also the titanium respectively into the mixture, and also 60 pounds of the ferro-zirconium as used in Example 2 were added and the container from which it was added was rinsed with the remaining 10 gallons of mixed solvents to be sure to add all of it.

*Example 4*

Example 1 was repeated in all of its details, except that (a) a total of 1100 pounds of the aluminum paste were used instead of only 550 pounds of it, (b) 68.9 pounds of the titanium were used instead of only 60 pounds of it, (c) the containers by which each of the finely divided silicon and titanium were added were rinsed respectively with a separate quantity of only 10 gallons of mixed solvents; and (d) 60 pounds of finely divided weld-improver metal molybdenum (325 mesh) were stirred into the mixture of the other substances and the container by which it was added was rinsed with 10 gallons of the mixed solvents to assure washing all of it into the mixing tank.

*Example 5*

Example 4 was repeated in all respects except that its 68.9 pounds of titanium were replaced by the same weight of the ferro-zirconium alloy as used in Example 2.

*Example 6*

Example 5 was repeated in all of its details, except that 30 pounds of finely divided anhydrous barium carbonate (325 mesh) were added and the container by which it was added was rinsed with a comparable volume of mixed solvents made available by using a smaller volume for rinsing in some of the other finely divided substances such as silicon, ferro-zirconium and molybdenum.

*Example 7*

Example 6 was repeated in all of its details, except that its 68.9 pounds of ferro-zirconium alloy were omitted and replaced by 68.9 pounds of the finely divided titanium as used in Example 4 and the volume of mixed solvents used to rinse the silicon, molybdenum and barium carbonate was reduced proportionately to make available a comparable volume of mixed solvents to be used in rinsing the container by which the titanium was added.

*Example 8*

Example 6 was repeated in all of its details, except that 70.2 pounds of the titanium of Example 1 was added, and the respective volumes of mixed solvents used to rinse the respective containers by which the ferro-zirconium, molybdenum and barium carbonate were added were reduced proportionately to provide a comparable volume of them for rinsing the container by which the titanium is added.

In any of the preceding Examples 2, 3, 5, 6 and 8, the ferro-zirconium alloy of that specific analysis can be replaced by any other ferro-zirconium alloy or by finely divided zirconium itself within the applicable range of from about 0.2 to about 5% by weight of the total composition (and of at least 200 mesh and more advantageously of 325 mesh).

*Example 9*

Example 4 was repeated in all of its details, except that (a) its 68.9 pounds of titanium and 60 pounds of molybdenum were omitted and replaced by 30 pounds of finely divided anhydrous barium carbonate (325 mesh) stirred into the mixture of the other substances, and (b) the containers by which each of the finely divided silicon and barium carbonate were added were rinsed respectively with a separate quantity of 15 gallons each of mixed solvents.

The barium carbonate of Example 9 can be replaced by the same weight of anhydrous calcium carbonate and strontium carbonate respectively separately, thereby to provide the corresponding weld-enhancer suspension composition of identical composition except for calcium carbonate in place of barium carbonate in one case and strontium carbonate in place of barium carbonate in the other, respectively.

Any of the individual constituents used in any of the foregoing examples may be varied in respective volume or weight used within the respective ranges hereinabove recited for them.

In some formulations of the compositions of the invention at least part of the silicon can be replaced by a metallurgically compatible grade of ferro-silicon. Then the silicon content of the latter is to be included as its respective part of the total silicon. Accordingly, this combined reactive form of silicon is included as equivalent in the general reference to silicon in the claims. In the same way, at least part of the titanium in some formulations can be replaced by an equivalent amount of a metallurgically compatible grade of ferro-titanium. The latter reactive form of titanium similarly is included as equivalent in the general reference to titanium in the claims.

The particle size of the various weld-improving agents should be below that which would interfere with adequate adherence of the dry-to-the-touch thermo-set film-coating applied to the metal to be welded, so as to cause the film to flake or peel.

The weld-improving agents are inert to and compatible with the resins and also to their solvents. Other than to dissolve or colloidally disperse them, the solvents otherwise are inert to the resins. They are also inert to the weld-improving agents.

The content of resinous binder in the complete liquid composition is so proportioned to its solvent content and that of its mixture of all of the weld-improving agents to enable applying by flow-coating a film-coating of the composition and a substantially completely continuous, firmly adherent, dry-to-the-touch, non-peeling and non-flaky film of the resinous binder with the admixed weld-improving agents fixedly dispersed and held therein so left on the metal surface after evaporation of the solvent for the binder from that film-coating of the composition.

Thus, the total resinous binder content of the organic suspending-binding vehicle should be sufficient to hold the finely divided particles of weld-improving agents securely on the metal surface after evaporation of the primarily hydrocarbon solvent for the binder, in such satisfactorily adherent, thermo-set, dust-free, non-flaking and non-peeling film-coating. Such organic suspending-binding vehicle thus is referred to conveniently as an adherent-film-leaving suspending-binding vehicle.

Since the quantities of the aromatic and the aliphatic hydrocarbons present in the compositions of the various Examples 1 through 9 total about 95% of their entire solvent content, and the hydroxyl portion of the quantity of butanol in these mixed solvents apparently does not exceed 1.3 percent of their total, and a similar relationship could exist if a chlorinated hydrocarbon were used, the solvent or mixture of solvents used for the resinous binder generally is referred to herein as "substantially hydrocarbon solvents" and may be referred to also as at least primarily hydrocarbon. Generally, the particular amounts, and combination, of the different types of solvents to use depends on the dispersibility or solubility of the selected resins in the specific solvents and the relative volatility of the latter in relation to the time required for the film remaining, after their evaporation to be dry-to-the touch.

The relatively low boiling petroleum fractions can serve very effectively in the aliphatic hydrocarbon portion of the solvent, advantageously the fraction having a boiling range of from about 155° to 161° F.

*Example 10*

The method of the invention was carried out by shaking a quantity of the composition of the invention as prepared in Example 1 in the spray composition holder of a paint spray gun and spraying a continuous film-coating of the shaken mixture over the site to be welded and along the route of the weld to be made of two separate sheets of cold-rolled steel, to provide a coating of about one-half inch width along the area to be welded together of each of these sheets. The two separate film coatings then were allowed to air dry, and were dry-to-the-touch within a little under 15 minutes.

The two edges to be welded together then were placed in contact with the dried film-coating of the composition of Example 1 exposed, and the two sheets then were welded together by inert (Heliarc A.C.) arc welding with a tungsten electrode at high heat. The welding occurred with a substantially quiet, practically completely non-spattering weld pool and yielded a highly uniform, clean weld which, under magnification, showed a good fine-grained crystal structure indicative of a strong tough weld.

Separately repeating Example 10 but each time using the fluxing primer mixed composition of a different one of the other Examples 2 through 9 respectively, in each case resulted in substantially similar clean and tough welds showing, under enlargement, similar fine-grained crystal structure at the weld.

Example 10 and each of the foregoing variations of it can be repeated by replacing the cold-rolled steel used in Example 10 by some other steel or ferrous alloy to be welded, or by some other iron group metal (cobalt and nickel) or any alloy of any of them, with correspondingly similar results.

The method of the invention need not be restricted to use with heliarc welding. Any of the other commonly applicable welding methods, such as those earlier above mentioned, can be used instead.

The admixed weld-improving agents more advantageously contribute significantly effective improvement in the resulting weld, by their being held fixedly dispersed in the substantially completely continuous, dry-to-the-touch, non-peeling and non-flaky film of the resinous binder firmly adhering to the surface of the metal. It is also advantageous that that firmly adhering film serves to protect the edges to be welded while the organic film is still over the areas to be welded until it is burned away, and leaving the therein dispersed weld-improving agents well distributed over those edges for more effective advantage as the weld pool is developed.

In the weld pool the light weight oxygen-getter elements as well as the multi-valence heavy metals titanium and zirconium, showing a greater oxidation potential than the metal to be welded combine with occluded oxygen and nitrogen and some of them in the air about the weld pool. Other portions of these elements and metals also combine preferentially not only with oxygen and nitrogen combined with some of the metal as oxides and nitrides but also with the carbon of some of it present as carbide to form the corresponding oxides, nitrides and carbides.

Some of these, such as the oxides of the light weight metals, and perhaps even of titanium or zirconium oxide, and silica, may be blown away by the force of the welding flame. Others such as the nitrides and carbides particularly of the heavy metals, and especially the molybdenum and excess of the added metals as titanium and zirconium, over that part of them which formed compounds, e.g. nitrides and carbides, remain in the finished weld as alloys with the base metal that was welded and so contribute to improving the weld. These retained compounds and excess metals, possibly by alloying, or precipitation hardening, or enhancing the purity, contribute to a tougher and finer-grained, and thus stronger, weld. The barium carbonate appears to contribute not only to subdue spattering in the weld pool but also to enhancement of the properties of the finished weld.

Greater stability of the arc in the arc welding also is observed when the compositions and method of the invention are used. The generally improved exterior character of the weld, such as by a smoother and generally flatter outer surface, is an advantage in a number of ways including reduction or elimination of grinding where it might otherwise be used.

When the invention has been explained by detailed description of certain specific embodiments of it, it is understood that various modifications and substitutions can be made in any of such embodiments within the scope of the appended claims which are intended also to cover equivalents of the different specific embodiments.

What is claimed is:

1. A liquid, reaction weld-enhancer mixture composition flow-coatably applicable at the site and along the route of a weld to be made in metal, which composition comprises
 (A) as a minor portion thereof a mixture of finely divided weld-improving agents which include,
  (a) as by far the major part of said mixture of said agents, a mixture of oxygen-getter elements consisting essentially of,
   (i) by far its minor fraction, the metalloid silicon, and
   (ii) by far its major fraction, at least one member of the class of light weight metals consisting of aluminum, magnesium, and zinc; and
  (b) as by far the minor part of said weld-improving agents, at least one weld-enhancer material member of the class consisting of the multi-valence heavy metals molybdenum, titanium and zirconium, and the alkaline earth metal carbonates; said mixture of weld-improving agents being admixed in (B) a flow-coatable, non-carbonizing, adherent-film-leaving, organic suspending-binding vehicle which is the major portion of said composition and comprises
  (a') an organic thermo-setting film-forming resinous binder soluble in substantially hydrocarbon solvents and inert to said weld-improving agents, which binder, after evaporation of the solvent medium in which it is dispersed, serves to hold the particles of said agents fixedly dispersed in an adherent film on the surface of the metal to be welded with said film being substantially dry-to-the-touch, non-peeling and non-flaky after thermo-setting and non-combustible when subjected on the surface of said metal to a temperature about 500° F. and without appreciable change in adhesion thereto at about 700° F. and substantially non-carbonizing when finally burning away at higher temperature; and,
  (b') as the major content of said vehicle, a primarily hydrocarbon solvent for said binder, which solvent is otherwise inert to said binder and to said weld-improving agents, and being volatilizable from a film-coating of said mixture composition deposited on said metal to be welded, at from ambient temperature to a temperature under the flash point of the solvent below the welding temperature, to leave behind a substantially completely continuous and adherent film of the binder having the admixed weld-improving agents fixedly dispersed within it; said composition containing by weight from at least about 0.1 percent of at least one of the aforesaid weld-enhancer materials up to a total of about 5 percent of any of them included, and from about 0.5 to about 1.5 percent of silicon; the total of admixed weld-improving agents being so proportioned to the suspending-binding vehicle to enable the complete liquid composition to be applied by flow-coating to the metal to be welded, and the resinous binder being so proportioned to the solvent and the mixture of all of said weld-improving agents to enable a substantially completely continuous, firmly adherent, dry-to-the-touch, non-peeling and non-flaky thermo-set film of the resinous binder with the particles of the admixed weld-improving agents fixedly dispersed therein to be applied to the metal to be welded.

2. A weld-enhancer mixture composition as claimed in claim 1, wherein the weld-improving agents consist essentially of aluminum, silicon, and titanium, the total of said agents being in the proportion of about 40 to about 50 parts of them jointly to from about 50 to about 60 parts of total resinous binder which latter consists essentially of from about 43 to about 54 percent of the butylated melamine-formaldehyde resin of Cymel 245-8, from about 16 to about 23 percent of the dehydrated castor oil modified alkyd resin of Rezyl 330-5, and from about 27 to about 35 percent of the alkyd resin of Rezyl 92-5; said weld-improving agents consisting of from about 75 to about 85 percent aluminum, from about 8 to about 5 percent of silicon, and from about 15 to about 11 percent of titanium; said resinous binder being dissolved in sufficient of a mixture of primarily hydrocarbon solvents made up of aliphatic and aromatic portions, to enable the complete mixture composition to be flow-coatably applied to a surface of a metal to be welded.

3. A weld-enhancer mixture composition as claimed in claim 1, which contains as its sole weld-enchancer materials at least about 0.1 percent of each of titanium and molybdenum up to about 2.5 percent of each of them.

4. A weld-enhancer mixture composition as claimed in claim 3, wherein the weld-improving agents consist essentially of aluminum, silicon, titanium, and molybdenum, the total of said agents being in the proportion of about 55 to about 68 parts of them jointly to from about 42 to about 35 parts of total resinous binder which latter consists essentially of from about 43 to about 54 percent of the butylated melamine-formaldehyde resin of Cymel 245-8, from about 16 to about 23 percent of the dehydrated castor oil modified alkyd resin of Rezyl 330-5, and from about 27 to about 35 percent of the alkyd resin of Rezyl 92-5; said weld-improving agents consisting of from about 75 to about 89 percent aluminum, from about 4 to about 3 percent of silicon, from about 7 to about 9 percent of titanium, and from about 8 to about 6 percent of molybdenum; said resinous binder being dissolved in sufficient of a mixture of primarily hydrocarbon solvents made up of aliphatic and aromatic portions, to enable the complete mixture composition to be flow-coatably applied to a surface of a metal to be welded.

5. A weld-enhancer mixture composition as claimed in claim 3, which contains also an alkaline earth metal carbonate to the extent of from about 0.1 percent to an amount about equal to the molybdenum.

6. A weld-enhancer mixture composition as claimed in claim 5, wherein the alkaline earth metal carbonate is barium carbonate.

7. A weld-enhancer mixture composition as claimed in claim 1, which contains as its sole weld-enhancer materials at least about 0.1 percent of each of zirconium and molybdenum up to about 2.5 percent of each of them.

8. A weld-enhancer mixture composition as claimed in claim 7, wherein the weld-improving agents consist essentially of aluminum, silicon, zirconium, molybdenum, and barium carbonate, the total of said agents being in the proportion of about 55 to about 68 parts of them jointly to from about 42 to about 35 parts of total resinous binder which latter consists essentially of from about 43 to about 54 percent of the butylated melamine-formaldehyde resin of Cymel 245-8, from about 16 to about 23 percent of the dehydrated castor oil modified alkyd resin of Rezyl 330-5, and from about 27 to about 35 percent of the alkyd resin of Rezyl 92-5; said weld-improving agents consisting of from about 75 to about 89 percent aluminum, from about 4 to about 3 percent of silicon, from about 1 to about 8 percent of zirconium, from about 8 to about 1 percent of molybdenum, and from about 4 to about 3 percent of barium carbonate; said resinous binder being dissolved in sufficient of a mixture of primarily hydrocarbon solvents made up of aliphatic and aromatic portions, to enable the complete mixture composition to be flow-coatably applied to a surface of a metal to be welded.

9. A weld-enhancer mixture composition as claimed in claim 1, wherein aluminum is the sole light weight metal and which contains also from about 0.1 percent of each of titanium, zirconium, molybdenum and barium carbonate to at most about 2 percent each of titanium and zirconium, and at most a total of about 5 percent of all four of them.

10. A weld-enhancer mixture composition as claimed in claim 9, wherein the weld-improving agents consist essentially of aluminum, silicon, titanium, zirconium, molybdenum, and barium carbonate, the total of said agents being in the proportion of about 80 to about 90 parts of them jointly to from about 40 to about 30 parts of total resinous binder which latter consists essentially of from about 45 to about 55 percent of the butylated melamine-formaldehyde resin of Cymel 245-8, from about 17 to about 23 percent of the dehydrated castor oil modified alkyd resin of Rezyl 330-5, and from about 27 to about 35 percent of the alkyd resin of Rezyl 92-5; said weld-improving agents consisting of from about 70 to about 80 percent aluminum, from about 3.6 to about 2.6 percent of silicon, from about 8 to about 6.5 percent of titanium, from about 6.7 to about 0.8 percent of zirconium, from about 7 to about 5.5 percent of molybdenum, and from about 3.5 to about 2.8 percent of barium carbonate;

said resinous binder being dissolved in sufficient of a mixture of primarily hydrocarbon solvents made up of aliphatic and aromatic portions, to enable the complete mixture composition to be flow-coatably applied to a surface of a metal to be welded.

11. The method of welding metal pieces which comprises (i) applying to the respective weld sites along the welding route at least one thermo-settable film-coating of approximately sufficient width, to be encompassed in the weld pool resulting in the subsequent welding step, of a liquid reaction weld-enhancer mixture composition as claimed in claim 1, with the admixture of finely divided weld-improving agents of said composition being dispersed throughout said film-coating;

(ii) allowing the solvent-dispersing agent for the binder to evaporate from said film-coating without disrupting it and so to leave behind on the metal surface a from at least only slightly tacky to dry-to-the-touch, substantially completely continuous adherent film with said weld-improving agents dispersed throughout it, (iii) causing said thermo-settable film-coating to be thermo-set;

(iv) raising the temperature of the metal to be welded along the welding route and including the metal surface covered by said film, by customary means for raising the temperature of metal to be welded to produce a weld pool, to a temperature high enough to burn off the organic content of said film and melt the contiguous metal to produce a weld pool about said earlier thus film-coated area; and (v) allowing the pool of molten metal at the successive welding sites along the welding route to solidify.

No references cited.

JOHN F. CAMPBELL, *Primary Examiner.*

L. J. WESTFALL, *Assistant Examiner.*

UNITED STATES PATENT OFFICE
CERTIFICATE OF CORRECTION

Patent No. 3,281,932  
November 1, 1966

Lionel Cinamon

It is hereby certified that error appears in the above numbered patent requiring correction and that the said Letters Patent should read as corrected below.

Column 2, line 70, for "the," read -- the --; column 3, line 35, after "titanium" insert -- and --; column 4, line 62, for "betwen" read -- between --; same line 62, for "its" read -- it --; line 68, for "user" read -- used --; column 5, line 28, for "its" read -- it --; column 6, line 73, for "or solid" read -- to solid --; column 8, line 10, for "eight" read -- eighth --; column 12, line 49, for "When" read -- While --.

Signed and sealed this 9th day of January 1968.

(SEAL)  
Attest:

Edward M. Fletcher, Jr.  
Attesting Officer

EDWARD J. BRENNER  
Commissioner of Patents